(12) United States Patent
Ens et al.

(10) Patent No.: US 11,893,199 B2
(45) Date of Patent: Feb. 6, 2024

(54) SYSTEMS AND METHODS FOR VIEWING INCOMPATIBLE WEB PAGES VIA REMOTE BROWSER INSTANCES

(71) Applicant: Microsoft Technology Licensing, LLC, Redmond, WA (US)

(72) Inventors: Michael J. Ens, Redmond, WA (US); Alex Glover, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/897,937

(22) Filed: Jun. 10, 2020

(65) Prior Publication Data
US 2021/0389846 A1 Dec. 16, 2021

(51) Int. Cl.
*G06F 3/0481* (2022.01)
*H04L 67/02* (2022.01)

(52) U.S. Cl.
CPC ............ *G06F 3/0481* (2013.01); *H04L 67/02* (2013.01)

(58) Field of Classification Search
CPC .............................. G06F 3/0481; H04L 67/02
See application file for complete search history.

(56) References Cited

U.S. PATENT DOCUMENTS

| | | | | |
|---|---|---|---|---|
| 7,818,681 B2 * | 10/2010 | Abuelsaad | .......... | G06F 9/44536 715/760 |
| 7,895,296 B1 * | 2/2011 | Dayan | ..................... | G06F 21/53 709/219 |
| 8,726,182 B1 * | 5/2014 | Murphy | ............... | G06F 3/04817 715/859 |
| 9,262,396 B1 * | 2/2016 | Rodriguez Valadez | ..................... | G06F 16/957 |
| 9,900,367 B2 * | 2/2018 | Branton | .................. | H04L 63/20 |
| 11,442,599 B2 | 9/2022 | Guta et al. | | |

(Continued)

FOREIGN PATENT DOCUMENTS

CN 107925685 A 4/2018

OTHER PUBLICATIONS

Garsiel et al., "How Browsers Work: Behind the scenes of modern web browsers," retrieved on Mar. 8, 2022, from https://www.html5rocks.com/en/tutorials/internals/howbrowserswork/ (reader mode version), published on Aug. 5, 2011 (55 pages) (Year: 2011).*

(Continued)

*Primary Examiner* — Eric J. Bycer

(57) ABSTRACT

Embodiments described herein enable a browser to display content of a web page that is incompatible therewith. When such a page is to be traversed, the first browser causes a virtual machine that executes an instance of a second browser with which the page is compatible to be instantiated. The browsers communicate via communication channels utilized to share information therebetween. For instance, the first browser provides a URL of the page to the second browser for traversal thereby. Graphics information corresponding to the page is provided to the first browser. The first browser generates an image corresponding to the page based on the graphics information and renders the image in a tab of the first browser. This enables a visual experience for the user where it appears that the page is being rendered by the first browser when it is in fact being rendered by the second browser.

20 Claims, 8 Drawing Sheets

(56) References Cited

U.S. PATENT DOCUMENTS

| | | | | |
|---|---|---|---|---|
| 2001/0013043 | A1* | 8/2001 | Wagner | G06F 40/221 715/229 |
| 2002/0113812 | A1* | 8/2002 | Walker | G06F 16/252 707/E17.005 |
| 2005/0246444 | A1* | 11/2005 | Koehane | H04L 67/2819 709/227 |
| 2006/0010433 | A1* | 1/2006 | Neil | G06F 9/45533 717/138 |
| 2006/0288083 | A1* | 12/2006 | Ueda | G06F 9/4843 709/217 |
| 2007/0192329 | A1* | 8/2007 | Croft | H04L 67/141 |
| 2007/0239859 | A1* | 10/2007 | Wilkinson | H04L 63/08 709/220 |
| 2007/0260702 | A1* | 11/2007 | Richardson | G06F 9/45558 709/217 |
| 2007/0271505 | A1* | 11/2007 | Dandekar | G06Q 10/0832 715/234 |
| 2008/0098067 | A1* | 4/2008 | O'Sullivan | G06Q 10/109 709/204 |
| 2008/0229331 | A1* | 9/2008 | Khijniak | G06F 9/544 719/317 |
| 2008/0301562 | A1* | 12/2008 | Berger | G06F 16/958 715/733 |
| 2009/0172519 | A1* | 7/2009 | Xu | G06F 16/9577 715/234 |
| 2009/0210482 | A1* | 8/2009 | Wynn | G06F 9/452 709/203 |
| 2010/0042636 | A1* | 2/2010 | Lu | H04L 67/02 709/203 |
| 2010/0211865 | A1* | 8/2010 | Fanning | G06F 16/9577 715/234 |
| 2010/0269046 | A1* | 10/2010 | Pahlavan | G06F 9/452 715/740 |
| 2011/0157219 | A1* | 6/2011 | Chakra | G06F 3/14 345/619 |
| 2011/0302510 | A1 | 12/2011 | Harrison et al. | |
| 2012/0166975 | A1* | 6/2012 | Oh | G06F 16/957 715/760 |
| 2013/0007642 | A1* | 1/2013 | Abuelsaad | G06F 16/9535 715/760 |
| 2013/0014126 | A1* | 1/2013 | Zana | G06F 9/54 719/313 |
| 2013/0104060 | A1* | 4/2013 | Chandra | G06F 16/957 715/760 |
| 2013/0262555 | A1* | 10/2013 | Hochmuth | H04L 67/10 709/201 |
| 2013/0339842 | A1* | 12/2013 | Zhang | G06F 16/957 715/234 |
| 2014/0026057 | A1* | 1/2014 | Kimpton | G06F 9/451 715/733 |
| 2014/0108496 | A1* | 4/2014 | Heller | G06F 16/951 709/203 |
| 2014/0149995 | A1* | 5/2014 | Tian | G06F 16/957 719/313 |
| 2014/0380315 | A1* | 12/2014 | Khajuria | G06F 16/188 718/1 |
| 2015/0026682 | A1* | 1/2015 | Singh | G06F 21/53 718/1 |
| 2015/0094150 | A1* | 4/2015 | Gregory | A63F 13/30 463/42 |
| 2015/0161277 | A1 | 6/2015 | Heller et al. | |
| 2015/0324479 | A1* | 11/2015 | Seidle, Jr. | G06F 16/9577 715/234 |
| 2015/0341367 | A1* | 11/2015 | Kus | G06F 21/6218 726/1 |
| 2016/0023111 | A1 | 1/2016 | Gregory et al. | |
| 2016/0062727 | A1* | 3/2016 | Handrigan | G06F 16/9038 715/753 |
| 2016/0266780 | A1* | 9/2016 | Wu | G06F 16/955 |
| 2017/0034127 | A1* | 2/2017 | Singleton, IV | H04L 61/2503 |
| 2017/0339250 | A1 | 11/2017 | Momchilov et al. | |
| 2017/0374130 | A1* | 12/2017 | AbiEzzi | H04L 67/025 |
| 2020/0319865 | A1* | 10/2020 | Levi | G06F 11/3612 |
| 2020/0387273 | A1 | 12/2020 | Guta et al. | |
| 2022/0391231 | A1 | 12/2022 | Guta et al. | |

OTHER PUBLICATIONS

Mishra, Praveen, "Browser Engines: The Crux of Cross Browser Compatibility," retrieved on Mar. 8, 2022, from https://www.lambdatest.com/blog/browser-engines-the-crux-of-cross-browser-compatibility/ (reader mode version), published on Aug. 27, 2019 (17 pages) (Year: 2019).*

"International Search Report and Written Opinion Issued in PCT Application No. PCT/US2020/030339", dated Jul. 14, 2020, 12 Pages.

Jackson, Chris., "Configure IE mode policies", Retrieved from: https://docs.microsoft.com/en-us/deployedge/edge-ie-mode-policies, Mar. 25, 2020, 5 Pages.

Ross, et al., "Welcome to Remote Desktop Services", Retrieved from: https://docs.microsoft.com/en-us/windows-server/remote/remote-desktop-services/welcome-to-rds, Feb. 22, 2017, 2 Pages.

Wesley, et al., "About IE mode", Retrieved from: https://docs.microsoft.com/en-us/deployedge/edge-ie-mode, Mar. 25, 2020, 4 Pages.

"Non Final Office Action Issued in U.S. Appl. No. 16/566,689", dated Apr. 14, 2021, 17 Pages.

"Final Office Action Issued in U.S. Appl. No. 16/566,689", dated Sep. 22, 2021, 20 Pages.

"International Search Report and Written Opinion Issued in PCT Application No. PCT/US21/025845", dated Jun. 28, 2021, 14 Pages.

"Notice of Allowance Issued in U.S. Appl. No. 16/566,689", dated May 11, 2022, 5 Pages.

"Non Final Office Action Issued in U.S. Appl. No. 17/818,148", dated Jul. 5, 2023, 16 Pages.

"Office Action Issued in Indian Patent Application No. 202147050149", dated Aug. 25, 2023, 10 Pages.

"Notice of Allowance Issued in Chinese Patent Application No. 202080041817.7", dated Sep. 21, 2023, 4 Pages.

"First Office Action and Search Report Issued in Chinese Patent Application No. 202080041817.7", dated Sep. 6, 2023, 8 Pages.

* cited by examiner

SYSTEMS AND METHODS FOR VIEWING INCOMPATIBLE WEB PAGES VIA REMOTE BROWSER INSTANCES

BACKGROUND

A web browser (or "browser") is a software application for accessing information on the World Wide Web. A web browser is installed on user devices to enable users of those devices to retrieve resources (e.g., individual web pages, images, videos, etc.) from a web server and display them on the user devices. Web browsers are also used to run applications (e.g., webmail, online retail sales, online auction), referred to as "web applications" or "web apps." A web application is a client-server computer program in which the client (including the user interface and client-side logic) runs in a web browser. The client communicates with the server as needed to fulfill the functions of the web application at the user device.

As web browsers have progressed over the years, enterprises have developed content that takes advantage of the increasing capability of the advancing web browsers as well as the capabilities of new web browsers. In some cases, content, such as a web application, developed for a particular web browser type and/or browser version has not been updated to be compatible with more modern web browsers and/or browser versions. Accordingly, such content may be incompatible with newer web browsers and/or browser versions, and thus is forced to be run in less advanced browser types and/or versions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein enable a web browser to display content of a web page that is incompatible therewith. In aspects, when a Web page incompatible with a first web browser is to be traversed to, a virtual machine configured to execute an instance of a second web browser with which the page is compatible is instantiated. The virtual machine may execute remotely, for example, in a cloud-based platform. The first web browser and the second web browser communicate via communication channels utilized to share information therebetween. For instance, the first web browser provides a uniform resource locator (URL) of the Web page to the second web browser, and the second web browser traverses to the Web page accordingly. Graphics information corresponding to the Web page rendered by the second web browser is provided to the first web browser. The first web browser generates an image corresponding to the Web page based on the graphics information and renders the image in a browser window (e.g., a tab) of the first web browser. This enables a visual experience for the user where it appears that the web page is rendered by the first web browser (and not an image representative thereof) when it is in fact rendered by the second web browser.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
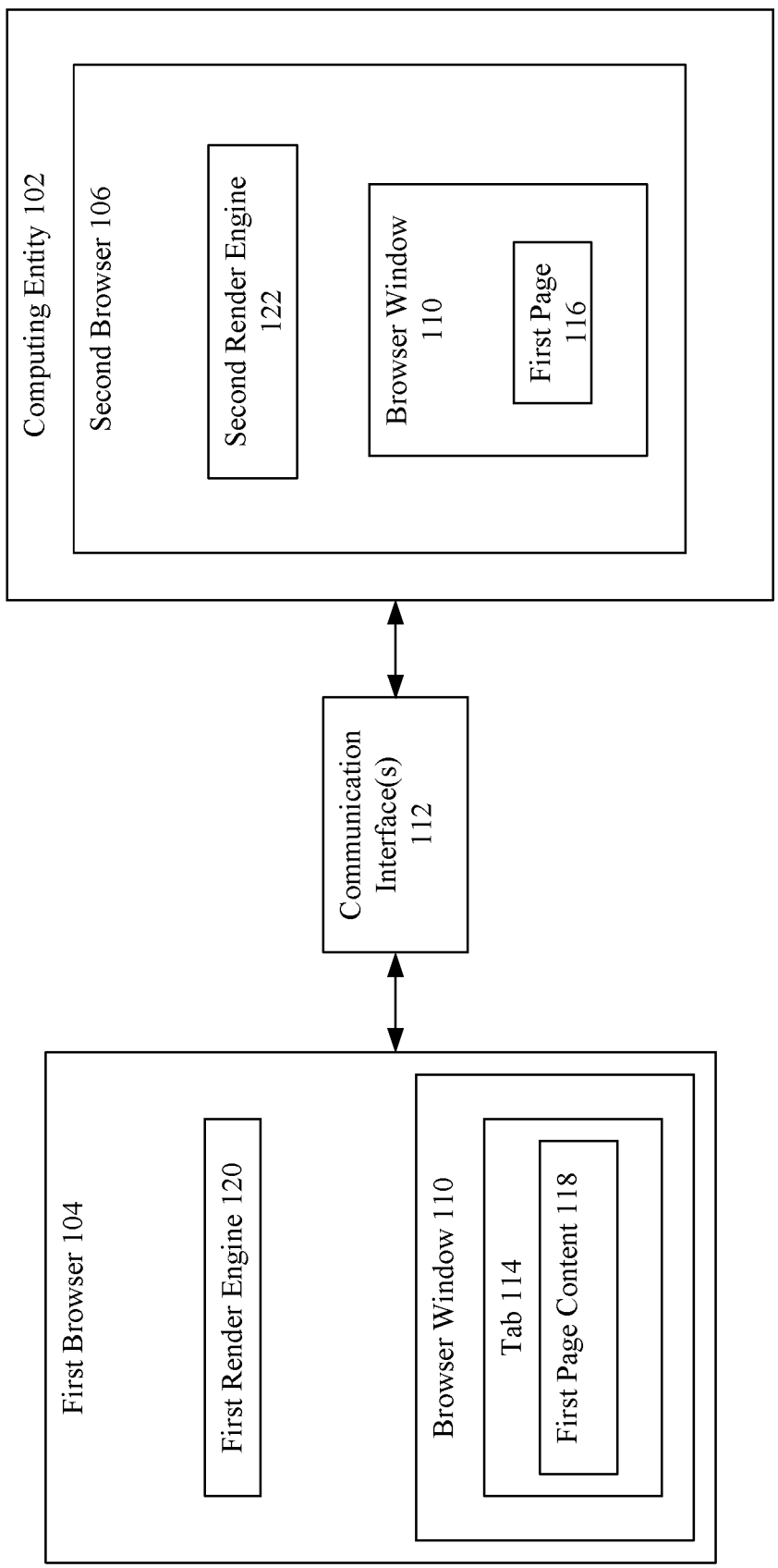
FIG. 1 shows a block diagram of a system for viewing a web page that is incompatible with a first browser via a second browser in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, as web browsers have progressed over the years, enterprises have developed content that takes advantage of the increasing capability of the advancing web browsers as well as the capabilities of new web browsers. In some cases, content, such as a web application, developed for a particular web browser type and/or browser version has not been updated to be compatible with more modern web browsers and/or browser versions. Accordingly, such content may be incompatible with newer web browsers and/or browser versions, and thus is forced to be run in less advanced browser types and/or versions. This is problematic for users using devices in which older web browsers are not installed and/or not available for such devices, as such users are unable to view such content.

In the case of a web application, a potential solution to this problem is that the web application be given dual solutions, meaning that multiple versions of the web application are developed and maintained (e.g., for each browser type/version of interest). However, such an approach consumes resources and time. Furthermore, users would need to know which browser version is compatible with which web application version. Another solution introduces the notion of auto-switching, where web applications would open up a new browser application and switch to that browser application based on a specification format that allowed administrators to specify a list of web app sites and the compatible browsers. However, this solution is visible to the user and very distracting. Another solution introduces the notion of invoking a new browser window for a browser compatible with a web app from an open browser window for an incompatible browser in which the web app was attempted to be opened. While this may be an improvement over other solutions, it has shortfalls including the need to switch between separate browsers in separate windows.

Embodiments described herein help address these and other issues related to content compatibility with web browsers. In embodiments, when a Web page incompatible with a first web browser is to be traversed to, a virtual machine configured to execute an instance of a second web browser with which the page is compatible is instantiated. The virtual machine may execute remotely, for example, in a cloud-based platform. The first web browser and the second web browser communicate via communication channels utilized to share information therebetween. For instance, the first web browser provides a uniform resource locator (URL) of the Web page to the second web browser, and the second web browser traverses to the Web page accordingly. Graphics information corresponding to the Web page rendered by the second web browser is provided to the first web browser. The first web browser generates an image corresponding to the Web page based on the graphics information and renders the image in a browser window or tab of the first web browser. This enables a visual experience for the user where it appears that the web page is being rendered by the first web browser (and not an image representative thereof) when it is in fact being rendered by the second web browser.

Such embodiments may be implemented in various ways. For instance, FIG. 1 shows a block diagram of a system 100 for viewing a web page that is incompatible with a first browser via a second browser, according to an example embodiment. As shown in FIG. 1, system 100 includes a first browser 104 and a computing entity 102. Examples of computing entity 102 include, but are not limited to physical computing devices and emulated computing devices. Examples of physical computing devices include any type of mobile computing device, such as a Microsoft® Surface® device, a personal digital assistant (PDA), a laptop computer, a notebook computer, a tablet computer such as an Apple® iPad™, a netbook, a smart phone (such as an Apple® iPhone®, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), or other browser-enabled device. An example of an emulated computing device includes a virtual machine. In accordance with an embodiment, first browser 104 executes on a computing device that is remotely-located to computing entity 102. In accordance with another embodiment, first browser 104 and computing entity 102 execute on the same computing device.

First browser 104 includes a first render engine 120 and has an open browser window 110. Computing entity 102 is configured to execute a second browser 106 that is not installed on the computing device on which first browser 104 executes. Second browser 106 includes a second render engine 122. As shown in FIG. 1, first browser 104 and computing entity 102 are communicatively coupled via one or more communication interface(s) 112. Examples of communication interface(s) include, but are not limited to, application programming interfaces (APIs), a Universal Serial Port (USB) port and/or cable, an IEEE 1394 (FireWire®) port and/or cable, an RS-232 port and/or cable, an RJ-45 port and/or cable, etc.

First browser 104 and second browser 106 are web browsers, which are software applications configured for accessing information on the World Wide Web. For instance, first browser 104 and second browser 106 may be configured to receive links to web pages, to retrieve the web pages at the addresses indicated by the links, and to render pages for display to a user of a computing device on which first browser 104 executes. Examples of first browser 104 and second browser 106 include Internet Explorer® or Microsoft Edge®, both developed by Microsoft Corp. of Redmond, Washington, Mozilla Firefox®, developed by Mozilla Corp. of Mountain View, California, Safari®, developed by Apple Inc. of Cupertino, California, and Google® Chrome™ developed by Google Inc. of Mountain View, California. In embodiments, first and second browsers 104 and 106 are different from each other. For instance, first and second browsers 104 and 106 may be different web browser types (e.g., Google® Chrome™ and Microsoft Edge®). Alternatively, first and second browsers 104 and 106 may be different versions of a same web browser.

First render engine 120 and second render engine 122 of first browser 104 and second browser 106, respectively, are each configured to generate a display of content in browser windows and/or browser tabs of browser windows, including transforming HTML (hypertext markup language) documents and other resources of a web page into an interactive visual representation. In an embodiment, each of first and second render engines 120 and 122 may be configured to perform page layout and rendering of content within a display window region of a corresponding browser window and/or tab. Examples of browser engines include Gecko™ used in the Mozilla Firefox® web browser, the WebKit™ engine used by the Apple Safari browser, Trident™ (MSHTML) used in Internet Explorer™, and Blink™ used in the Google_Chrome® and Microsoft Edge® Browsers.

As described above, web pages may be compatible with some browsers but not others. For instance, first page 116 may be compatible with second browser 106 but not compatible with first browser 104. In such case, first browser 104 may cause computing entity 102 to execute an instance of second browser 104. In an embodiment in which computing entity 102 is a physical computing device, first browser 104 may provide a request, via communication interface(s) 112, to computing entity 102 that causes computing entity 102 to launch second browser 106. In an embodiment in which computing entity 102 is a virtual machine, first browser 104 may provide a request, via communication interface(s) 112, that cause a virtual machine to be instantiated (either locally to the computing device on which first browser 104 executes or a remote virtual machine, for example, maintained by a cloud services platform) to execute an instance of second browser 106. As shown in FIG. 1, second browser 106 renders first page 116 in browser window 110. The contents of first page 116 are provided to first browser 104 via communication interface(s) 112, and first render engine 120 renders the contents of first page 116 within a tab 114 (shown as first page content 118). In this way, pages compatible with second browser 106, but not with first browser 104, may still be displayed to users within first browser 104 even when second browser 106 is not installed on the same computing device on which first browser 104 executes, thus providing an improved user experience. This may be accomplished in various ways.

Figure 2:
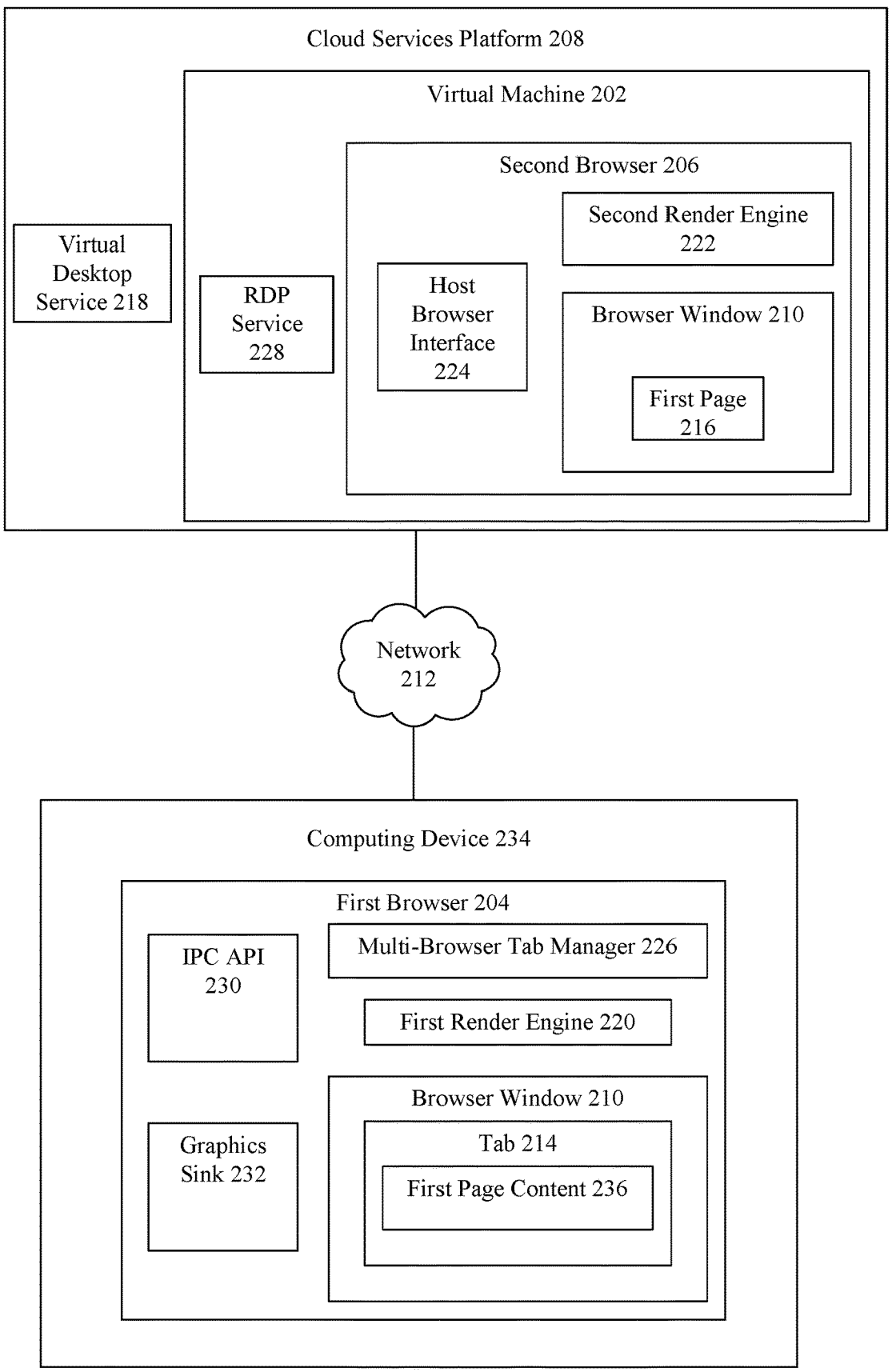
FIG. 2 shows a block diagram of a system for viewing a web page that is incompatible with a first browser via a remote second browser executing on virtual machine in accordance with an example embodiment.

For example, FIG. 2 depicts a block diagram of a system for viewing a web page that is incompatible with a first browser via a remote second browser executing on virtual machine in accordance with an example embodiment. As shown in FIG. 2, system 200 comprises a computing device 234 and a cloud service platform 208 that are communicatively coupled via a network 212. Network 212 may comprise one or more networks such as local area networks (LANs), wide area networks (WANs), enterprise networks, the Internet, etc., and may include one or more of wired and/or wireless portions. Computing device 234 is a computing device via which a user is enabled to run applications and visit web pages compatible with various web browsers. Computing device 234 may be any type of mobile computing device, such as a Microsoft® Surface® device, a personal digital assistant (PDA), a laptop computer, a notebook computer, a tablet computer such as an Apple iPad™, a netbook, a smart phone (such as an Apple® iPhone®, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), or other browser-enabled device.

As shown in FIG. 2, computing device 234 comprises a first browser 204, which is an example of first browser 104, as described above with reference to FIG. 1. First browser 204 comprises a multi-browser tab manager 226 and a first render engine 220. First render engine 220 is an example of first render engine 120, as described above with reference to FIG. 1. First render engine 220 of first browser 204 is configured to generate a display of content in a display window region of browser windows and/or browser tabs of browser windows, including transforming HTML (hypertext markup language) documents and other resources of a web page into an interactive visual representation.

In accordance with at least one embodiment, cloud services platform 208 comprises part of the Microsoft® Azure® cloud computing platform, owned by Microsoft Corporation of Redmond, Washington, although this is only an example and not intended to be limiting. Cloud services platform 208 comprises a virtual desktop service 218.

Multi-browser tab manager 226 is configured to receive navigation requests to pages of web applications and determine whether a page to which such a request is directed is compatible with a different browser but not first browser 204, such as by conferring with a browser compatibility list. The browser compatibility list may list particular items of content, web applications, file extensions, and/or other identifiers for content that other browser(s) are compatible with (e.g., is capable of rendering) and that first browser 204 is not compatible with. If multi-browser tab manager 226 determines that a requested page is compatible with first browser 204 (e.g., is not identified in the browser compatibility list as incompatible with first browser 204), then first browser 204 receives the web address and renders the page within first browser 204 as normal (e.g., within a browser window 210 and/or a tab 214 of browser window 210. However, if multi-browser tab manager 226 determines that the page is compatible with another browser (which is not installed on computing device 234), but not first browser 204 (e.g., is identified in the browser compatibility list as compatible with the other browser but incompatible with first browser 204), then multi-browser tab manager 226 causes a virtual machine configured to execute a compatible browser to be instantiated.

For example, an interface of multi-browser tab manager 226 of first browser 204 may issue an invocation request (e.g., an API (application programming interface) call) via network 212 to virtual desktop service 218 executing in cloud service platform 208. The invocation request causes virtual desktop service 218 to invoke a virtual machine 202 configured to execute a browser that is compatible with the page (e.g., second browser 206) and configured to execute a service that enables first browser 204 and second browser 206 communicate. Virtual machine 202 is an example of computing entity 102, as described above with reference to FIG. 1. The service may comprise a remote desktop protocol (RDP) service 228. Each of virtual desktop service 218 and virtual machine 202 may execute via one or more nodes (or servers) of cloud service platform 208 that are communicatively coupled via a network. An example of virtual desktop service 218 includes but is not limited to Windows® Virtual Desktop published by Microsoft® Corporation of Redmond Washington.

The invocation request may include user credentials (e.g., username, password, access token, etc.) of the user of computing device 234. For instance, upon attempting to access an incompatible web page via first browser 204, the user may be prompted to enter his or her user credentials, which are provided to virtual desktop service 218 via the invocation request. Virtual desktop service 218 authenticates the user using the received user credentials to determine whether the user is authorized to utilize virtual desktop service 218 and/or instantiate virtual machine 202. Upon successful authentication, virtual desktop service 218 instantiates virtual machine 202 and/or provides a confirmation to first browser 204 that virtual machine 202 has been instantiated.

Virtual machine 202 may initiate (or launch) second browser 206 via a virtual machine-initiated request including one or more parameters (e.g., command line parameter(s)) that cause second browser 206 to load host browser interface 224. For instance, the parameter(s) may specify the name of host browser interface 224 and/or a location from which to load host browser interface 224. Host browser interface 224 may be implemented as a dynamic link library (DLL), which is loaded into the process of second browser 206 (e.g., from a DLL library maintained by virtual machine 202 in response to receiving the request).

As shown in FIG. 2, second browser 206 further comprises a second render engine 222. Second render engine 222 of second browser 206 is configured to generate a display of content in browser windows and/or browser tabs of browser windows, including transforming HTML (hypertext markup language) documents and other resources of a web page into an interactive visual representation. In an embodiment, second render engine 222 configured to perform page layout and rendering of content. Second render engine 222 is an example of second render engine 122, as described above with reference to FIG. 1.

RDP service 228 is configured to establish one or more communication channels between first browser 204 and second browser 206. The communication channel(s) established via RDP service 228 are examples of communication interface(s) 112, as described above with reference to FIG. 1.

In accordance with an embodiment, one such communication channel is a dynamic virtual channel. The dynamic virtual channel enables inter process communication (IPC) between first browser 204 and second browser 206. For instance, first browser 204 may comprise an IPC API 230 configured to communicate with host browser interface 224 via RDP service 228. In accordance with an embodiment IPC API 230 comprise one or more remote desktop core APIs.

Upon determining that the requested page is incompatible with first browser 204, first browser 204 may issue a navigation request via IPC API 230 to RDP service 228. The navigation request includes a uniform resource locator (URL) of the incompatible web page. RDP service 228 provides the message to host browser interface 224.

Host browser interface 224 may determine whether the identified page is compatible with second browser 206 but not first browser 204. For instance, host browser interface 224 may confer with a browser compatibility list to make the determination. The browser compatibility list accessed by host browser interface 224 may be the same page compatibility used by multi-browser tab manager 226 or a different one. Upon determination that a page is compatible with second browser 206 and not first browser 204, host browser interface 224 causes second render engine 222 to render the page (shown as first page 216) in a browser window 210 of second browser 206.

Second browser 206 provides contextual information associated with first page 216 to first browser 204, for example, via the dynamic virtual channel. For instance, upon rendering first page 216, host browser interface 224 provides contextual information to IPC API 230 of first browser 204 via RDP service 228.

One example of contextual information includes the title of first page 216. For instance, host browser interface 224 may provide a message to IPC API 230 that specifies the title of first page 216. Multi-browser tab manager 226 may display the title in the title bar of tab 214. Another example of contextual information includes a window identifier of the browser window in which first page 216 is rendered (e.g., browser window 210). The window identifier may comprise the handle of browser window 210 (e.g., HWND).

Second browser 206 may further provide status information associated with first page 216 to first browser 204, for example, via the dynamic virtual channel. For instance, host browser interface 224 may provide a message to IPC API 230 that comprises information indicating indicate whether a web page being loaded and/or rendered by second render engine 222 is large in size and/or is taking a long time to load. Based on the status information, first browser 204 causes a user interface element to be rendered via first browser 204 to indicate the status. For example, the user interface element may be a spinning wheel or ring (also referred to as a "throbber") utilized by first browser 204. The user interface element utilized by second browser 206 to reflect this status (i.e., the second browser's version of the throbber) is not displayed via first browser 204. Instead, the user interface element utilized by first browser 204 is utilized.

In another example, the status information may indicate whether a web page being loaded and/or rendered by second render engine 222 is favorited by the user. Based on this information, first browser 204 causes a user interface element to be rendered via first browser 204 to indicate the favorited status. For example, the user interface element may be a star shown in the address bar of first browser 204. The user interface element utilized by second browser 206 to reflect this status (i.e., the second browser's version of the star) is not displayed. Instead, the user interface element utilized by first browser 204 is utilized. The foregoing techniques advantageously enables a seamless integration of Web pages renderable via second browser 206 within first browser 204.

It is noted that the contextual and status information described above is purely exemplary and that the contextual and status information may include any type of information that first browser 204 utilizes to display contextual or status information and/or utilize its own version of a particular user interface element.

To receive the content of first page 216, first browser 204 may instantiate a graphics sink 232 for the window in which first page 216 is rendered by second render engine 222 (i.e., window 210). Graphics sink 232 may comprise an API, which is configured to receive graphics information from via RDP service 228. The graphics information is received over a second communication channel that is different than the first communication channel. In accordance with an embodiment, the second communication channel is a remote applications integrated locally (RAIL)-based communication channel. The graphics information may comprise data for each pixel of first page 216 rendered by second render engine 222. Data for each pixel may comprise bits representative of one or more colors for that pixel. First render engine 220 may analyze the received pixel data and generate an image (e.g., a bitmap, a JPEG, a TIFF, a GIF, etc.) that represents first page 216 rendered by second render engine. First render engine 220 sizes the image to fit in the display window region of tab 214 (shown as first page content 236) and places the content 236 over the display window region to give the appearance that first page 216 is rendered in tab 214. It is noted that the graphics information does not comprise information associated with any of the UI elements of second browser 206, but only the content that is rendered in a display window region of browser window 210.

Second browser 206 may provide a window identifier identifying browser window 210 to which graphics information corresponds. The window identifier may comprise the handle of browser window 210 (e.g., HWND). First render engine 220 associates the status/contextual information received via the first communication channel and the graphics information received via the second communication channel using the windows identifiers received via the first and second communication channels. This way, first render engine 220 properly associates the received status/contextual information with the corresponding graphics information.

Multi-browser tab manager 226 is further configured to detect user input with respect to tab 214. User input detected with respect to content 236 is provided to second browser 206 via the first communication channel. For example, IPC API 230 may provide a message to host browser interface 224 via RDP service 228. For user input such as mouse clicks, touch screen interactions, etc., the message may include coordinates of where the clicks, interactions, etc. occurred. Second render engine 222 utilizes the coordinates and generates the corresponding user input at the coordinates.

For instance, suppose a user clicks on a region of content 236 comprising a URL. IPC API 230 provides the coordinates of the click with respect to content 236 to host browser interface 224 via RDP service 228. Second render engine 222 generates (e.g., emulates) the mouse click at those coordinates, which correspond to the location of the URL of first page 216. Host browser interface 224 determines whether the Web page located at the URL is compatible with second browser 206, but not first browser 204. For instance, host browser interface 224 may confer with the browser compatibility list to make the determination. Upon determination that a page is compatible with second browser 206 and not first browser 204, second render engine 222 renders the page in browser window 210. RDP service 228 provides graphics information corresponding to the new page being rendered in browser window 210 to graphics sink 232. First render engine 220 analyzes the received graphics information and generates an image (e.g., a bitmap) that represents the new page rendered by second render engine 222. First render engine 220 sizes the image to fit in the display window region of tab 214 and places the bitmap over the display window region to give the appearance that the new page is rendered in tab 214.

Upon determination that the page is compatible with first browser 204, host browser interface 224 provides the URL of the page to IPC API 230 via RPD service 228. Responsive to receiving URL, multi-browser tab manager 226 determines whether URL is compatible with first browser 204. Upon determination that the page is compatible with first browser 204, for example, by conferring with the browser compatibility list, first render engine 220 stops displaying the content 236, multi-browser tab manager 226 navigates to the URL, and first render engine 220 renders the Web page within tab 214.

The displaying of content 236 may also be terminated responsive to a user navigating to another web page using the user interface of first browser 204. For instance, suppose a user types in a URL of another Web page in the address bar of browser window 210. Multi-browser tab manager 226 determines whether the typed URL is compatible with first browser 204, for example, by conferring with the browser compatibility list. Upon determination that the page is compatible with first browser 204, first render engine 220 stops displaying content 236, multi-browser tab manager 226 navigates to the URL, and first render engine 220 renders the Web page within tab 214.

In another example, suppose a user performs a scroll up or scroll down operation (e.g., via a mouse wheel, a keyboard, a touch screen swipe, etc.). IPC API 230 provides the scroll event to host browser interface 224 via RDP service 228. Second render engine 222 generates (e.g., emulates) the scroll event with respect to browser window 210 and scrolls first page 216 or up or down (depending on the scroll event) accordingly. RDP service 228 provides graphics information corresponding to the portion of first page 216 now visible via browser window 210 to graphics sink 232. First render engine 220 analyzes the received graphics information and generates an image (e.g., a bitmap) that represents the visible portion of first page 216 rendered by second render engine 222. First render engine 220 sizes the image to fit in the display window region of tab 214 and places the image over the display window region to give the appearance that the newly-visible portion of first page 216 is rendered in tab 214.

First browser 204 may implement a policy for maintaining the connection with virtual machine 202. In accordance with an embodiment, the connection with virtual machine 202 is terminated responsive to all browser windows and/or tabs displaying content (e.g., content 236) received via first browser 204 being closed. In accordance with another embodiment, the connection with virtual machine 202 is terminated responsive to a determination that the user has not performed any activity for a predetermined duration of time (e.g., 30 minutes, 60 minutes, 120 minutes, etc.) with respect to a browser window and/or tab of first browser 204 in which content received via second browser 206 is displayed. It is noted that such policies are merely exemplary and that first browser 204 may utilize other policies for terminating its connection with virtual machine 202.

Figure 3:
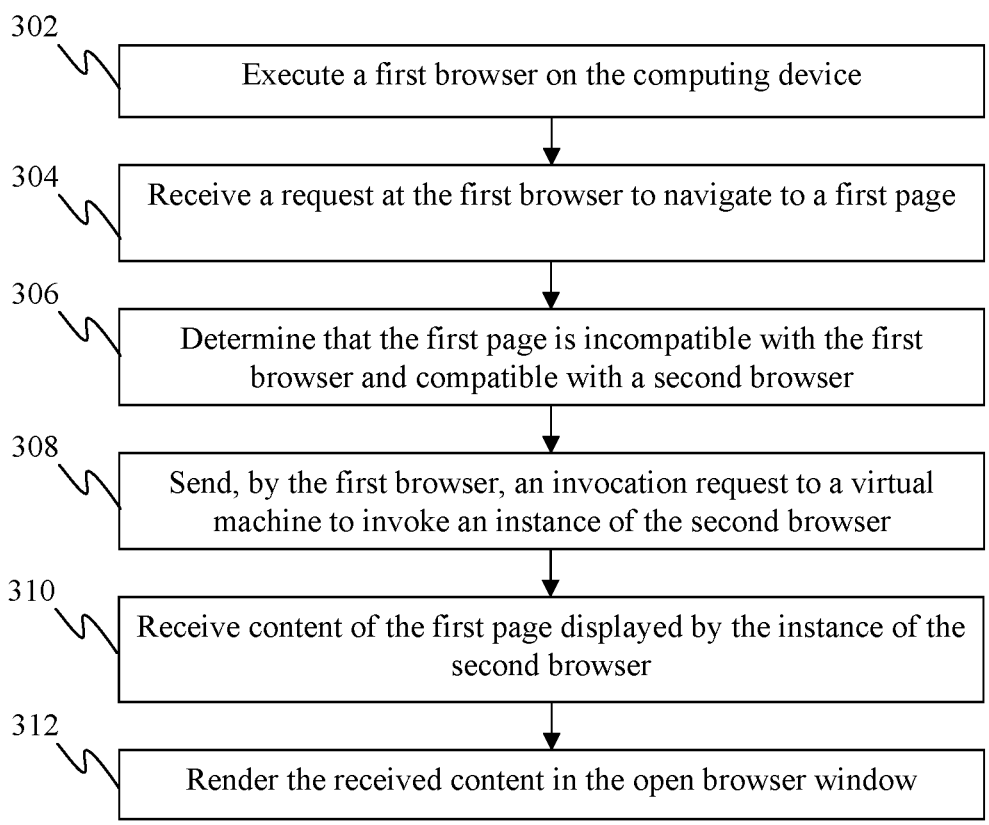
FIG. 3 shows a flowchart of a method in a computing device for viewing a Web page within a first browser that is incompatible with the first browser in accordance with an example embodiment.

Accordingly, pages incompatible with a first browser may be displayed using a remote, second browser 204 in many ways. For example, FIG. 3 shows a flowchart 300 of a method in a computing device for viewing a Web page within a first browser that is incompatible with the first browser in accordance with an example embodiment. In an embodiment, flowchart 300 may be implemented by first browser 204 executing on computing device 234. For purposes of illustration, flowchart 300 is described with continued reference to FIG. 2. Other structural and operational embodiments will be apparent to persons skilled in the relevant art(s) based on the following discussion.

Flowchart 300 of FIG. 3 begins with step 302. In step 302, a first browser is executed on the computing device, the first browser having an open browser window. For instance, as shown in FIG. 2, first browser 204 executes on computing device 234. First browser 204 has browser window 210 open. In embodiments, a user of computing device 234 may have invoked first browser 204, or first browser 204 may have been invoked by the invocation of a web application.

In step 304, a request is received at the first browser to navigate to a first page. For instance, and with reference to FIG. 2, multi-browser tab manager 226 may receive a request to navigate to first page 216. In embodiments, the navigation request may be initiated by a user of computing device 234, such as by a link click in a currently opened page in tab 214 or other open tab (causing tab 214 to open), or by a history navigation (e.g., by the user selecting a browser back button or forward button) with tab 214 the active tab. The navigation request includes an address to first page 216, such as in the form of a uniform resource location (URL) or other address type.

In step 306, a determination is made that the first page is incompatible with the first browser and compatible with a second browser. In an embodiment, multi-browser tab manager 226 may be configured to determine that first page 216 is compatible with second browser 206 and incompatible with first browser 204.

In embodiments, multi-browser tab manager 226 may determine that first page 216 is compatible with first browser 204 or second browser 206 based on an administrator defined list, such as by accessing a browser compatibility list as described above. However, this is not intended to be limiting and multi-browser tab manager 226 may make this determination in other ways, as would be apparent to persons skilled in the relevant art(s) from the teachings herein.

In step 308, the first browser sends an invocation request to a virtual machine to invoke an instance of the second browser. For example, with reference to FIG. 2, multi-browser tab manager 224 may send an invocation request to virtual desktop service 218 to invoke a virtual machine (e.g., virtual machine 202) that is configured to execute a second browser (e.g., second browser 206) that is compatible with first page 216 and not installed on computing device 234. The virtual machine invoked is also configured to execute RDP service 228 to enable communication between first browser 204 and second browser 206. Responsive to receiving the invocation request, virtual desktop service 218 instantiates virtual machine 202.

In accordance with one or more embodiments, an address of the first page is provided to the instance of the second browser via a first communication channel established between the first browser and the instance of the second browser. For example, with reference to FIG. 2, multi-browser tab manager 226 provides a message specifying the URL of first page 216 to second browser 206 over a first communication channel between IPC API 230 and host browser interface 224. IPC API 230 may provide the message to host browser interface 224 of second browser 206 via RDP service 228. Upon traversing to the address, second render engine 222 renders first page 216 in browser window 210.

In accordance with an embodiment, the virtual machine executes on a remote computing device that is communicatively coupled to the computing device via a network. For example, with reference to FIG. 2, virtual machine 202 executes on a node (or server) maintained by a cloud services platform 208 that is communicatively coupled to computing device 234 via network 212.

In step 310, content of the first page displayed by the instance of the second browser is received. For example, with reference to FIG. 2, RDP service 228 provides content of first page 216 to first browser 204.

In step 312, the received content is rendered in the open browser window. For example, with reference to FIG. 2, first render engine 220 renders the received content (content 236) in browser window 210.

In accordance with one or more embodiments, the content is received via a second communication channel established between the first browser and the instance of the second browser, and the content of the first page is rendered over a display window region of a tab in the open browser window of the first browser. For example, with reference to FIG. 2, RDP service 228 obtains the content via second browser 206 and provides the content to graphics sink 232 of first browser 204. First render engine 220 renders the received content over a display window region of tab 214 of browser window 210.

In accordance with one or more embodiments, the first communication channel is a dynamic virtual channel (DVC), and the second communication channel is a remote applications integrated locally (RAIL) communication channel. For example, with reference to FIG. 2, first browser 204 and second browser 206 may exchange messages and/or information using the dynamic virtual channel established via IPC API 230, RDP service 228, and host browser interface 224, and second browser 206 may provide Web page content and first browser 204 may receive Web page content using the RAIL communication channel established via graphics sink 232 and RDP service 228.

Figure 4:
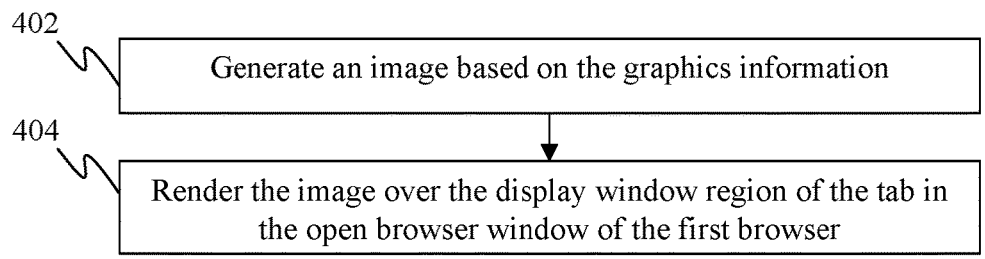
FIG. 4 shows a flowchart of a method for generating an image corresponding to a Web page rendered by the second browser in accordance with an example embodiment.
Figure 5:
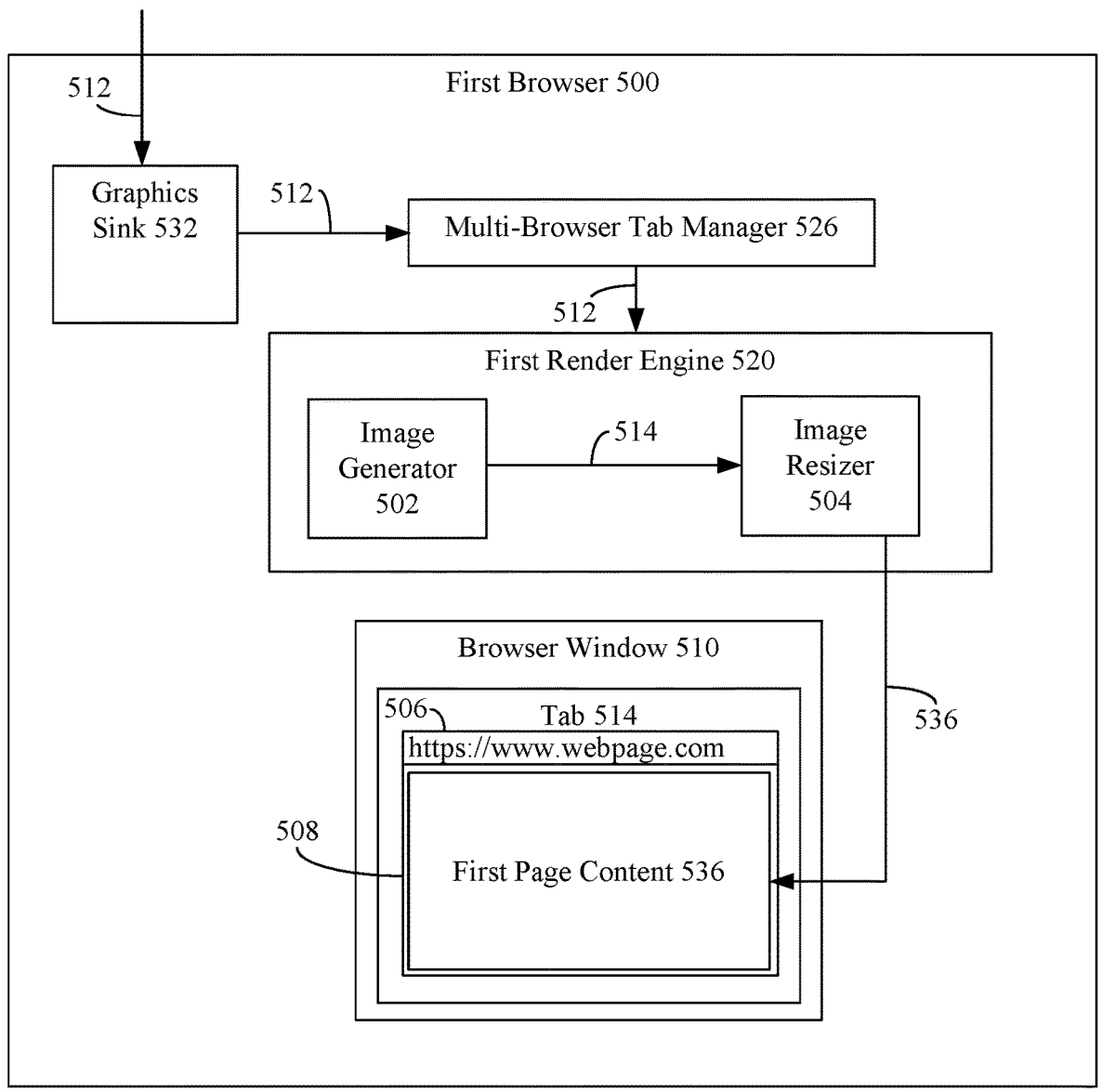
FIG. 5 depicts a block diagram of a first browser configured to generate an image corresponding to Web page rendered by a second browser in accordance with an example embodiment.

In accordance with one or more embodiments, the content received comprises graphics information that is utilized by the first browser to generate an image corresponding to the Web page rendered by the second browser. FIG. 4 shows a flowchart 400 of a method for generating an image corresponding to a Web page rendered by the second browser in accordance with an example embodiment. In an embodiment, flowchart 400 may be implemented by first browser 500, as shown in FIG. 5. FIG. 5 depicts a block diagram of first browser 500 configured to generate an image corresponding to Web page rendered by a second browser in accordance with an example embodiment. As shown in FIG. 5, first browser 500 comprises a graphics sink 532, a multi-browser tab manager 526, and a first render engine 520. Graphics sink 532, multi-browser tab manager 526, and first render engine 520 are examples of a graphics sink 232, multi-browser tab manager 226, and first render engine 220, as described above with reference to FIG. 2. First render engine 520 comprises an image generator 502 and an image resizer 504. First browser 500 has an open browser window 510. As further shown in FIG. 5, graphics sink 532 receives graphics information 512 (e.g., pixel data) representative of the page being rendered by the second browser (e.g., second browser 206, as shown in FIG. 2). Additional components described above with reference first browser 500 are not shown for brevity. Other structural and operational embodiments will be apparent to persons skilled in the relevant art(s) based on the following discussion.

Flowchart 400 of FIG. 4 begins with step 402. In step 402, an image is generated based on the graphics information. For example, with reference to FIG. 5, graphics sink 532 provides graphics information 512 to multi-browser tab manager 526, which in turn, provides graphics information 512 to first render engine 520. In accordance with an embodiment, graphics information 512 comprises data for each pixel being rendered for the Web page displayed via the second browser. The data for each pixel may comprise bits representative of one or more colors for that pixel. Image generator 502 analyzes the received graphics information 512 and generates an image 514 that represents the Web page rendered by the render engine of the second browser. In accordance with an embodiment, image 514 is a bitmap, although the embodiments described herein are not so limited. For instance, image 514 may be formatted in accordance with other file formats, such as JPEG, GIF, PNG, TIFF, etc. Image 514 is provided to image resizer 504.

Image resizer 504 is configured to size image 514 such that is fits over a display window region of a tab (e.g., tab 514) in which the Web page is to be displayed. For instance, as shown in FIG. 5, first browser 500 has received a navigation request to www.webpage.com. This URL is shown in address bar 506 of tab 514. Multi-browser tab manager 526 determines that this web page is incompatible with first browser 500, but compatible with another browser. Below address bar 506 (and other UI elements of first browser 500 that are not shown for brevity) is display window region 508, which is a region in which web page content is typically rendered. Image resizer 504 may be configured to determine the size of display window region 508 (e.g., the height, width, area, etc.) and resize image 514 to fit the determined size of display window region 508. The resized image (shown as resized image 536) may be substantially the same size as display window region 508 or may be a size that is smaller than display window region 508.

At step 404, the image is rendered over the display window region of the tab in the open browser window of the first browser. For example, with reference to FIG. 5, first render engine 520 renders resized image 536 over display window region 508 of tab 514 of browser window 510. Resized image 536 is an example of content 236, as described above with reference to FIG. 2.

In accordance with an embodiment, first browser 500 may display content from multiple incompatible pages via multiple tabs and/or windows. In accordance with such an embodiment, first browser 500 utilizes a single instance of the second browser for viewing each of the pages. Each incompatible web page may be opened in a respective window of the second browser.

Figure 6:
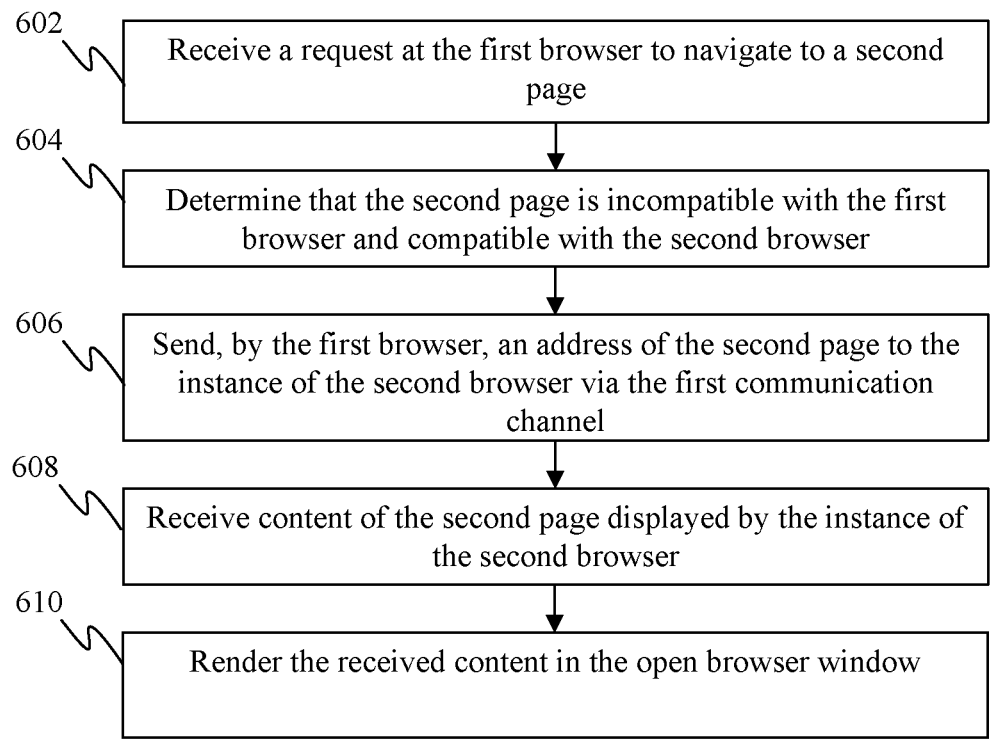
FIG. 6 shows a flowchart of a method for viewing content from multiple incompatible Web pages in a first browser in accordance with an example embodiment.
Figure 7:
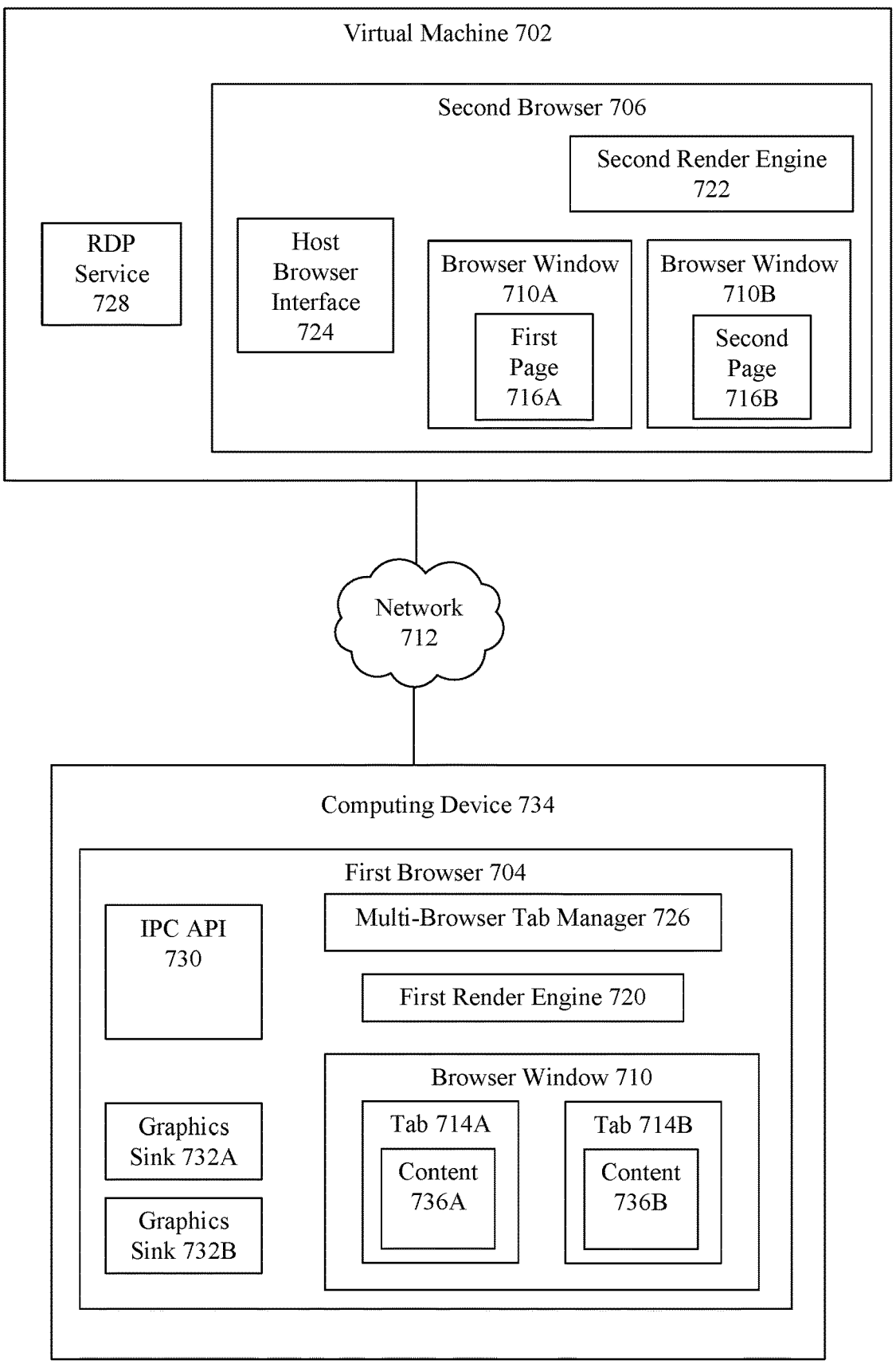
FIG. 7 depicts a block diagram of system for viewing content from multiple incompatible Web pages in a first browser in accordance with an example embodiment.

For example, FIG. 6 shows a flowchart 600 of a method for viewing content from multiple incompatible Web pages in a first browser in accordance with an example embodiment. In an embodiment, flowchart 600 may be implemented by a first browser 704, as shown in FIG. 7. FIG. 7 depicts a block diagram of system 700 for viewing content from multiple incompatible Web pages in a first browser in accordance with an example embodiment. As shown in FIG. 7, system 700 comprises a virtual machine 702 and a computing device 734 communicatively coupled via a network 712. Computing device 734, virtual machine 702, and network 712 are examples of computing device 234, virtual machine 202, and network 212, as described above with reference to FIG. 2. First browser 704 executes on computing device 734. First browser 704 comprises a multi-browser tab manager 726, a first render engine 720, an IPC API 730, a graphics sink 732A, and a graphics sink 732B. First browser 704, IPC API 730, multi-browser tab manager 726, and first render engine 720 are examples of first browser 202, IPC API 230, multi-browser tab manager 226, and first render engine 220, as described above with reference to FIG. 2. Graphics sink 732A and 732B are examples of graphics sink 232, as described above with reference to FIG. 2. As further shown in FIG. 7, first browser 704 has a browser window 710 opened. Browser window 710 is an example of browser window 210, as described above with reference to FIG. 2. Virtual machine 702 comprises an RDP service 728 and executes a second browser 706. RDP service 728 and second browser 706 are examples of RDP service 228 and second browser 206, as described above with reference to FIG. 2. Second browser 706 comprises a host browser interface 724 and a second render engine 722. Host browser interface 724 and second render engine 722 are examples of host browser interface 224 and second render engine 222, as described above with reference to FIG. 2.

As further shown in FIG. 7, first browser 704 displays content 736A corresponding to first page 716A in a first tab 714A. First page 716A is rendered via a browser window 710A of second browser 706. First page 716A, tab 714A and content 736A are examples of first page 216, tab 214, and content 236, as described above with reference to FIG. 2. Content 236 is displayed in accordance with the embodiments described above with reference to FIGS. 2-5.

Flowchart 600 of FIG. 6 begins with step 602. In step 602, a request is received at the first browser to navigate to a second page. For instance, and with reference to FIG. 7, multi-browser tab manager 726 may receive a request to navigate to a second page 716B. In embodiments, the navigation request may be initiated by a user of computing device 734, such as by a link click in another open tab (causing tab 714B to open). The navigation request includes an address to second page 716B, such as in the form of a uniform resource location (URL) or other address type.

In step 604, a determination is made that the second page is incompatible with the first browser and compatible with a second browser. In an embodiment, multi-browser tab manager 726 may be configured to determine that second page 716B is compatible with second browser 706 and incompatible with first browser 704.

In embodiments, multi-browser tab manager 726 may determine that second page 716B is compatible with first browser 704 or second browser 706 based on an administrator defined list, such as by accessing a browser compatibility list as described above. However, this is not intended to be limiting and multi-browser tab manager 726 may make this determination in other ways, as would be apparent to persons skilled in the relevant art(s) from the teachings herein.

In step 606, the first browser sends an address of the second page to the instance of the second browser via the first communication channel. For example, with reference to FIG. 7, multi-browser tab manager 726 provides a message specifying the URL of second page 716B to second browser 706 over the first communication channel between IPC API 730 and host browser interface 724. IPC API 730 may provide the message to host browser interface 724 of second browser 706 via RDP service 728. Upon traversing to the address, second render engine 722 renders second page 716B in another browser window (i.e., browser window 710B).

In step 608, content of the second page displayed by the instance of the second browser is received. For example, with reference to FIG. 7, first browser 704 instantiates a second graphics sink 732B, which is configured to receive the content (e.g., the graphics information representative of the content) of second page 716B from RDP service 728.

In step 610, the received content is rendered in the open browser window. For example, with reference to FIG. 2, first render engine 220 renders the received content in tab 714B. First render engine 720 is configured to render content in a similar manner described above with reference to FIGS. 4 and 5. In particular, first render engine 720 analyzes the graphics information received via graphics sink 732B, generates an image representative of second page 716B, resizes the image to fit the display window region of tab 714B, and/or renders the resized image over the display window region of tab 714B.

As described above, second browser 706 may provide status/contextual information pertaining to a web page via the first communication channel, and RDP service 728 may provide graphics information representative of the rendered web page via the second communication channel. In a scenario where multiple browser windows are open for second browser 706, first browser 704 must be able to determine which browser window the status/contextual information and graphics information pertains to. The foregoing is facilitated via window identifiers that are provided to first browser 704. For instance, when providing status/contextual information to first browser 704 for first page 716A rendered via browser window 710A, second browser 706 provides a window identifier (e.g., a handle) that identifies browser window 710A via the first communication channel. When providing status/contextual information to first browser 704 for second page 716B rendered via browser window 710B, second browser 706 provides a window identifier (e.g., a handle) that identifies browser window 710B via the first communication channel. Similarly, when providing graphics information representative of first page 716A rendered via browser window 710, second browser 706 provides a window identifier that identifies browser window 710A via the second communication channel. The window identifier for second window 710A is received via graphics sink 732A. When providing graphics information representative of first page 716B rendered via browser window 710, RDP service 728 may obtain a window identifier from second browser 706 that identifies browser window 710B via the second communication channel. The window identifier for second window 710B is received via graphics sink 732B.

First render engine 720 associates the status/contextual information received via the first communication channel and the graphics information received via the second communication channel using the windows identifiers received via the first and second communication channels. This way, second render engine 720 properly associates the received status/contextual information with the corresponding graphics information and renders the status/contextual information and images corresponding to first page 716A and 716B in the proper tab of tabs 714A and 714B.

Any user input received via first browser 704 and provided to second browser 704 via RDP service 728 may not be window or tab-specific, meaning that mouse input received at first browser 704 is automatically provided to the top window of browser windows 710A and 710B in the z-order at the coordinates specified by first browser 702, (as described above with reference to FIG. 2), and keyboard input is provided to the window of windows 710A and 710B having keyboard focus. The z-order and keyboard focus of the browser windows of the remote browser (i.e., second browser 706) will not necessarily match the z-order and keyboard focus of the browser windows and/or tabs of first browser 704. For example, as shown in FIG. 7, first browser 704 comprises two open tabs 714A and 714B, which respectively correspond to browser windows 710A and 710B. If the user clicks on tab 714A, but browser window 710B is on top, the input will incorrectly go to browser window 710B instead of browser window 710A.

Figure 8:
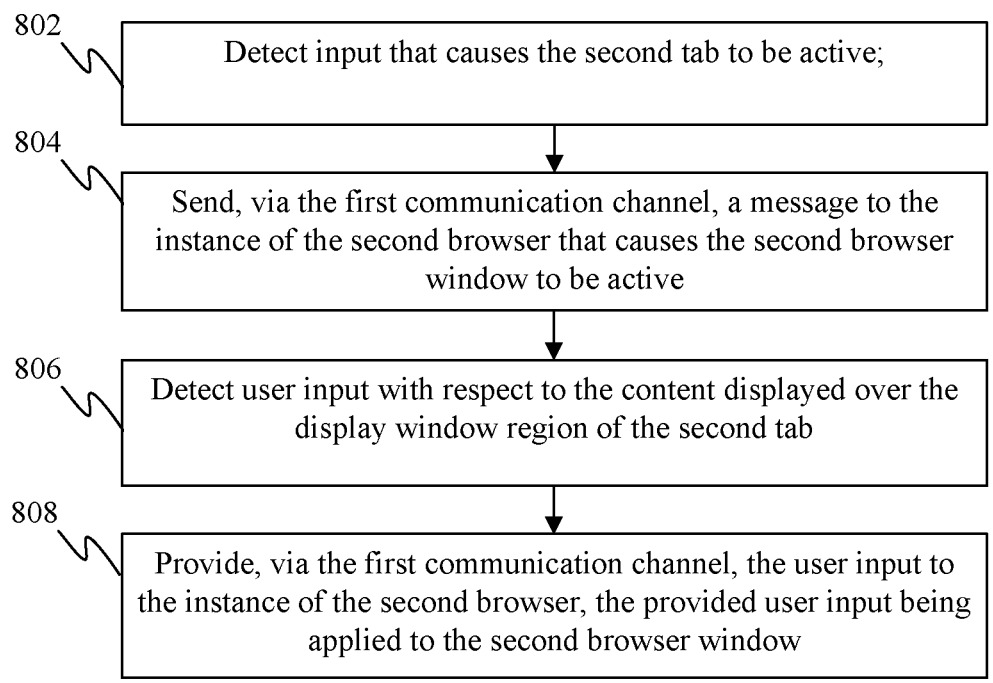
FIG. 8 shows a flowchart of a method for managing browser windows of a remote browser in accordance with an example embodiment.

To prevent this incorrect behavior, first browser 704 manages the browser window z-order and keyboard focus of the browser windows of second browser 706. In particular, first browser 704 ensures that the z-order or focus of browser windows 710A and 710B changes when the focus of tabs 714A and 714B change. For example, FIG. 8 shows a flowchart 800 of a method for managing browser windows of a remote browser in accordance with an example embodiment. In an embodiment, flowchart 800 may be implemented by first browser 704. For purposes of illustration, flowchart 800 is described with continued reference to FIG. 7. Other structural and operational embodiments will be apparent to persons skilled in the relevant art(s) based on the following discussion.

Flowchart 800 of FIG. 8 begins with step 802. In step 802, input that causes the second tab to be active is detected. For example, with reference to FIG. 7, multi-tab browser manager 726 detects input that causes tab 714B to be active. For instance, the input may be a mouse click over tab 714B.

In step 804, a message is sent to the instance of the second browser that causes the second browser window to be active. For example, with reference to FIG. 7, multi-browser tab manager 726 sends the message to second browser 706 via IPC API 730. The message may comprise the window identifier of the browser window of second browser 706 that is to be active (e.g., a windows identifier of browser window 716B). The message is received by RDP service 728, which provides the message to host browser interface of 724 of second browser 706. Second browser 706 causes browser window 710B to be active.

In step 806, user input with respect to the content displayed over the display window region of the second tab is detected. For example, with reference to FIG. 7, multi-browser tab manager 726 detects user input with respect to content 736B displayed via tab 714B. The input may be mouse input, touch screen input, keyboard input, etc.

In step 808, the user input is provided to the instance of the second browser via the first communication channel. The provided user input is applied to the second browser window. For example, with reference to FIG. 7, IPC API 730 provides a message specifying the detected user input to host browser interface 724 via RDP service 728. Second browser 706 applies the user input to second page 716B of browser window 710B.

III. Example Mobile and Stationary Device Embodiments

The systems and methods described above, including the management of incompatible web pages using remote browser instances described in reference to FIGS. 1-8, may be implemented in hardware, or hardware combined with one or both of software and/or firmware. For example, first browser 104, first render engine 120, communication interface(s) 112, computing entity 102, second browser 106, second render engine 122, cloud services platform 208, virtual desktop service 218, virtual machine 202, RDP service 228, second browser 206, host browser interface 224, second render engine 222, computing device 234, first browser 204, IPC API 230, graphics sink 232, multi-browser tab manager 226, first render engine 220, first browser 500, graphics sink 532, multi-browser tab manager 526, first render engine 520, image generator 502, image resizer 504, virtual machine 702, RDP service 728, second browser 706, host browser interface 724, second render engine 722, computing device 734, first browser 704, IPC API 730, graphics sinks 732A and 732B, multi-browser tab manager 726, and first render engine 720, and/or each of the components described therein, and flowchart 300, 400, 600, and/or 800 may be each implemented as computer program code/instructions configured to be executed in one or more processors and stored in a computer readable storage medium. Alternatively, first browser 104, first render engine 120, communication interface(s) 112, computing entity 102, second browser 106, second render engine 122, cloud services platform 208, virtual desktop service 218, virtual machine 202, RDP service 228, second browser 206, host browser interface 224, second render engine 222, computing device 234, first browser 204, IPC API 230, graphics sink 232, multi-browser tab manager 226, first render engine 220, first browser 500, graphics sink 532, multi-browser tab manager 526, first render engine 520, image generator 502, image resizer 504, virtual machine 702, RDP service 728, second browser 706, host browser interface 724, second render engine 722, computing device 734, first browser 704, IPC API 730, graphics sinks 732A and 732B, multi-browser tab manager 726, and first render engine 720, and/or each of the components described therein, and flowchart 300, 400, 600, and/or 800 may be implemented as hardware logic/electrical circuitry. In an embodiment, first browser 104, first render engine 120, communication interface(s) 112, computing entity 102, second browser 106, second render engine 122, cloud services platform 208, virtual desktop service 218, virtual machine 202, RDP service 228, second browser 206, host browser interface 224, second render engine 222, computing device 234, first browser 204, IPC API 230, graphics sink 232, multi-browser tab manager 226, first render engine 220, first browser 500, graphics sink 532, multi-browser tab manager 526, first render engine 520, image generator 502, image resizer 504, virtual machine 702, RDP service 728, second browser 706, host browser interface 724, second render engine 722, computing device 734, first browser 704, IPC API 730, graphics sinks 732A and 732B, multi-browser tab manager 726, and first render engine 720, and/or each of the components described therein, and flowchart 300, 400, 600, and/or 800 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
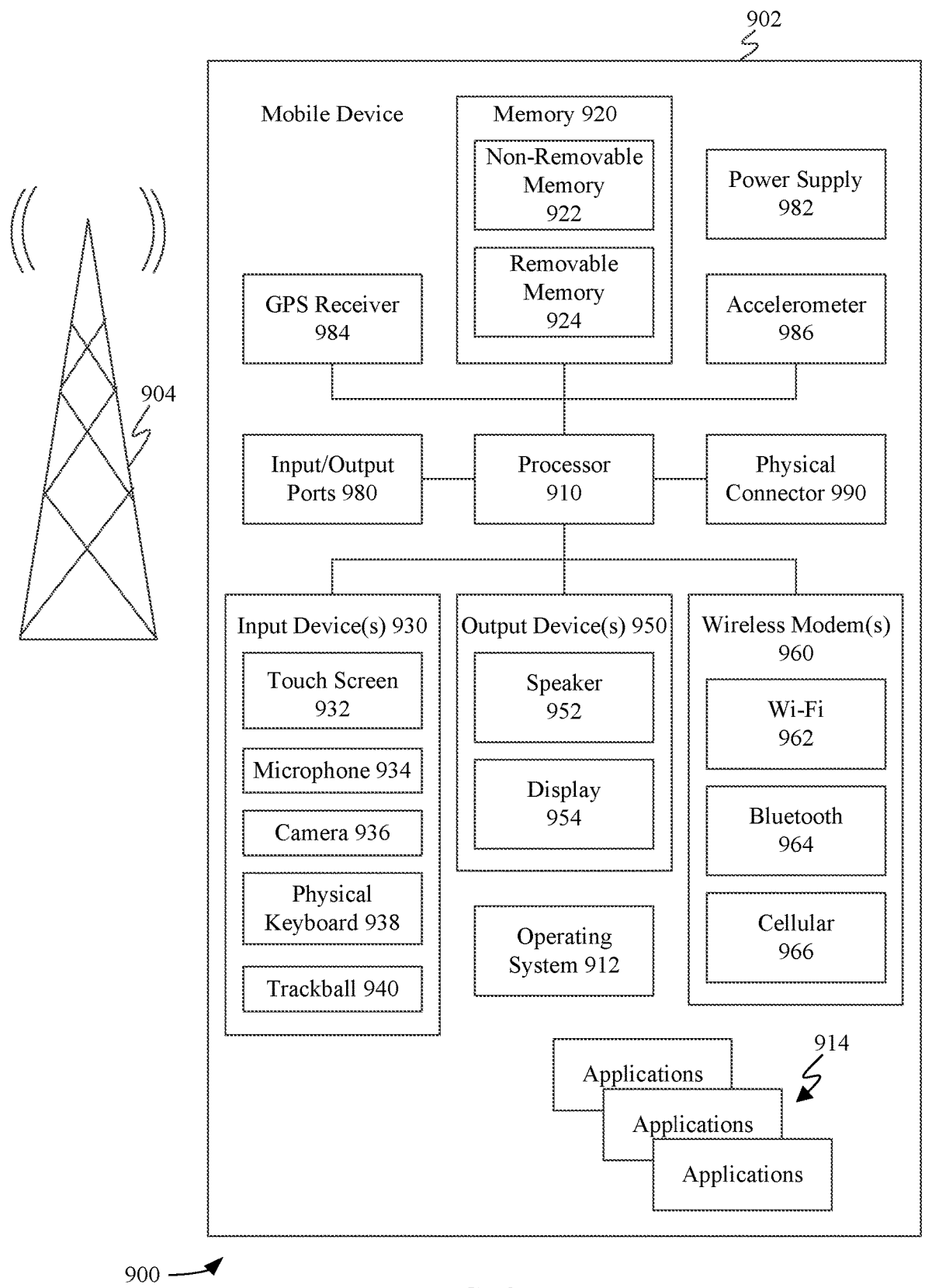
FIG. 9 is a block diagram of an exemplary user device in which embodiments may be implemented.

FIG. 9 shows a block diagram of an exemplary mobile device 900 including a variety of optional hardware and software components, shown generally as components 902. Any number and combination of the features/elements of first browser 104, first render engine 120, communication interface(s) 112, computing entity 102, computing device 234, first browser 204, IPC API 230, graphics sink 232, multi-browser tab manager 226, first render engine 220, first browser 500, graphics sink 532, multi-browser tab manager 526, first render engine 520, image generator 502, image resizer 504, virtual machine 702, computing device 734, first browser 704, IPC API 730, graphics sinks 732A and 732B, multi-browser tab manager 726, and first render engine 720, and/or each of the components described therein, and flowchart 300, 400, 600, and/or 800 may be implemented as components 902 included in a mobile device embodiment, as well as additional and/or alternative features/elements, as would be known to persons skilled in the relevant art(s). It is noted that any of components 902 can communicate with any other of components 902, although not all connections are shown, for ease of illustration. Mobile device 900 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 904, such as a cellular or satellite network, or with a local area or wide area network.

The illustrated mobile device 900 can include a controller or processor referred to as processor circuit 910 for performing such tasks as signal coding, image processing, data processing, input/output processing, power control, and/or other functions. Processor circuit 910 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 910 may execute program code stored in a computer readable medium, such as program code of one or more applications 914, operating system 912, any program code stored in memory 920, etc. Operating system 912 can control the allocation and usage of the components 902 and support for one or more application programs 914 (a.k.a. applications, "apps", etc.). Application programs 914 can include common mobile computing applications (e.g., email applications, calendars, contact managers, web browsers, messaging applications) and any other computing applications (e.g., word processing applications, mapping applications, media player applications).

As illustrated, mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running operating system 912 and applications 914. Example data can include web pages, text, images, sound files, video data, or other data sets to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing the systems described above, including the embodiments described in reference to FIGS. 1-8.

Mobile device 900 can support one or more input devices 930, such as a touch screen 932, microphone 934, camera 936, physical keyboard 938 and/or trackball 940 and one or more output devices 950, such as a speaker 952 and a display 954.

Other possible output devices (not shown) can include piezoelectric or other haptic output devices. Some devices can serve more than one input/output function. For example, touch screen 932 and display 954 can be combined in a single input/output device. The input devices 930 can include a Natural User Interface (NUI).

Wireless modem(s) 960 can be coupled to antenna(s) (not shown) and can support two-way communications between processor circuit 910 and external devices, as is well understood in the art. The modem(s) 960 are shown generically and can include a cellular modem 966 for communicating with the mobile communication network 904 and/or other radio-based modems (e.g., Bluetooth® 964 and/or Wi-Fi 962). Cellular modem 966 may be configured to enable phone calls (and optionally transmit data) according to any suitable communication standard or technology, such as GSM, 3G, 4G, 5G, etc. At least one of the wireless modem(s) 960 is typically configured for communication with one or more cellular networks, such as a GSM network for data and voice communications within a single cellular network, between cellular networks, or between the mobile device and a public switched telephone network (PSTN).

Mobile device 900 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire®) port, and/or RS-232 port. The illustrated components 902 are not required or all-inclusive, as any components can be not present and other components can be additionally present as would be recognized by one skilled in the art.

Figure 10:
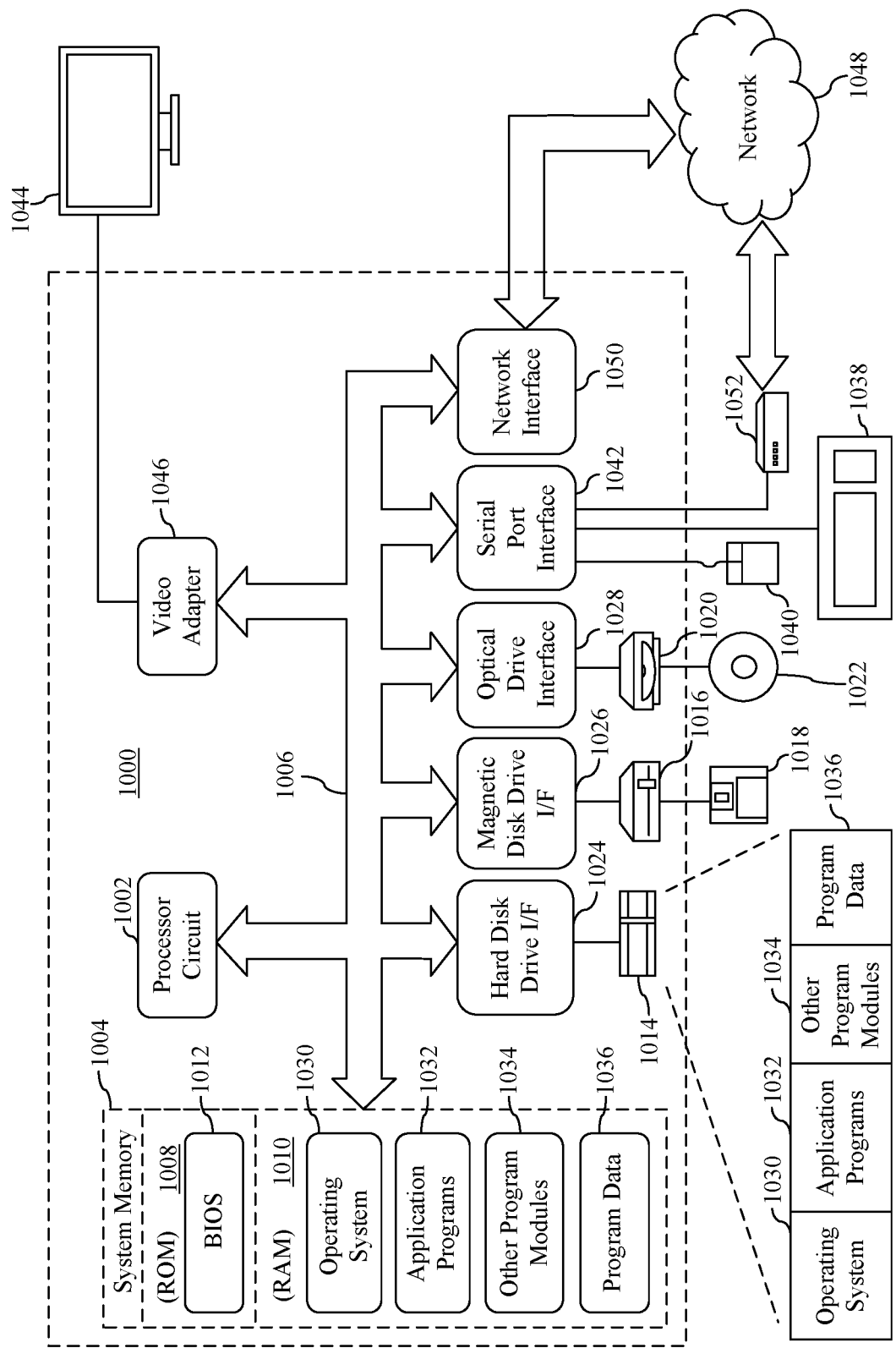
FIG. 10 is a block diagram of an example processor-based computer system that may be used to implement various embodiments.

Furthermore, FIG. 10 depicts an exemplary implementation of a computing device 1000 in which embodiments may be implemented, including first browser 104, first render engine 120, communication interface(s) 112, computing entity 102, computing device 234, first browser 204, IPC API 230, graphics sink 232, multi-browser tab manager 226, first render engine 220, first browser 500, graphics sink 532, multi-browser tab manager 526, first render engine 520, image generator 502, image resizer 504, virtual machine 702, computing device 734, first browser 704, IPC API 730, graphics sinks 732A and 732B, multi-browser tab manager 726, and first render engine 720, and/or each of the components described therein, and flowchart 300, 400, 600, and/or 800. The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing the systems described above, including the embodiments described above with reference to FIGS. 1-8.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including system memory 1004 of FIG. 10). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1052, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method in a computing device is described herein. The method comprises: executing a first browser on the computing device, the first browser having an open browser window; receiving a request at the first browser to navigate to a first page; determining that the first page is incompatible with the first browser and compatible with a second browser; sending, by the first browser, an invocation request to a virtual machine to invoke an instance of the second browser; receiving content of the first page displayed by the instance of the second browser; and rendering the received content in the open browser window.

In one embodiment of the foregoing method, the virtual machine executes on a remote computing device that is communicatively coupled to the computing device via a network.

In one embodiment of the foregoing method, the method further comprises: providing an address of the first page to the instance of the second browser via a first communication channel established between the first browser and the instance of the second browser.

In one embodiment of the foregoing method, receiving the content of the first page comprises: receiving the content via a second communication channel established between the first browser and the instance of the second browser; and rendering the content of the first page over a display window region of a tab in the open browser window of the first browser.

In one embodiment of the foregoing method, the first communication channel is a dynamic virtual channel (DVC), and the second communication channel is a remote applications integrated locally (RAIL) communication channel.

In one embodiment of the foregoing method, the content of the first page comprises graphics information representative of the content of the first page, and rendering the content of the first page comprises: generating an image based on the graphics information; and rendering the image over the display window region of the tab in the open browser window of the first browser.

In one embodiment of the foregoing method, the method further comprises: receiving a request at the first browser to navigate to a second page; determining that the second page is incompatible with the first browser and compatible with the second browser; sending, by the first browser, an address of the second page to the instance of the second browser via the first communication channel; receiving content of the second page displayed by the instance of the second browser; and rendering the received content in the open browser window.

In one embodiment of the foregoing method, the first page is rendered in a first browser window of the instance of the second browser, wherein the second page is rendered in a second browser window of the instance of the second browser, wherein the received content of the first page is displayed over a display window region of a first tab of the open browser window, and wherein the received content of the second page is displayed over a display window region of a second tab of the open browser window.

In one embodiment of the foregoing method, the method further comprises: detecting input that causes the second tab to be active; sending, via the first communication channel, a message to the instance of the second browser that causes the second browser window to be active; detecting user input with respect to the content displayed over the display window region of the second tab; and providing, via the first communication channel, the user input to the instance of the second browser, the provided user input being applied to the second browser window.

A system is also described herein. The system includes at least one processor circuit; and at least one memory that stores program code configured to be executed by the at least one processor circuit, the program code comprising: a tab manager configured to: receive a request at a first browser to navigate to a first page; and determine that the first page is incompatible with the first browser and compatible with a second browser; an application programming interface configured to: send an invocation request to a virtual machine to invoke an instance of the second browser; and receive content of the first page displayed by the instance of the second browser; and a render engine configured to render the received content in the open browser window.

In one embodiment of the foregoing system, the virtual machine executes on a remote computing device that is communicatively coupled to the computing device via a network.

In one embodiment of the foregoing system, the application programming interface is further configured to provide an address of the first page to the instance of the second browser via a first communication channel established between the first browser and the instance of the second browser.

In one embodiment of the foregoing system, the application programming interface is further configured to: receive the content via a second communication channel established between the first browser and the instance of the second browser; and render the content of the first page over a display window region of a tab in the open browser window of the first browser.

In one embodiment of the foregoing system, the first communication channel is a dynamic virtual channel (DVC), and wherein the second communication channel is a remote applications integrated locally (RAIL) communication channel.

In one embodiment of the foregoing system, the content of the first page comprises graphics information representative of the content of the first page, and wherein the render engine is further configured to: generate an image based on the graphics information; and render the image over the display window region of the tab in the open browser window of the first browser.

In one embodiment of the foregoing system, the tab manager is further configured to: receive a request at the first browser to navigate to a second page; and determine that the second page is incompatible with the first browser and compatible with the second browser; the application programming interface is further configured to: send an address of the second page to the instance of the second browser via the first communication channel; and receive content of the second page displayed by the instance of the second browser; and the render engine is further configured to render the received content in the open browser window.

In one embodiment of the foregoing system, the first page is rendered in a first browser window of the instance of the second browser, wherein the second page is rendered in a second browser window of the instance of the second browser, wherein the received content of the first page is displayed over a display window region of a first tab of the open browser window, and wherein the received content of the second page is displayed over a display window region of a second tab of the open browser window.

A computer-readable storage medium having program instructions recorded thereon that, when executed by at least one processor of a computing device, perform a method. The method includes: executing a first browser on the computing device, the first browser having an open browser window; receiving a request at the first browser to navigate to a first page; determining that the first page is incompatible with the first browser and compatible with a second browser; sending, by the first browser, an invocation request to a virtual machine to invoke an instance of the second browser; receiving content of the first page displayed by the instance of the second browser; and rendering the received content in the open browser window.

In one embodiment of the foregoing computer-readable storage medium, the virtual machine executes on a remote computing device that is communicatively coupled to the computing device via a network.

In one embodiment of the foregoing computer-readable storage medium, the method further comprises: providing an address of the first page to the instance of the second browser via a first communication channel established between the first browser and the instance of the second browser.

V. CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a computing device, comprising:
executing a first browser on the computing device, the first browser having an open browser window;
receiving a request at the first browser to navigate to a first page;
determining that the first page is incompatible with the first browser and compatible with a second browser;
sending, by the first browser to a virtual machine, an invocation request to invoke an instance of the second browser executing on the virtual machine, the virtual machine executing on a remote computing device that is communicatively coupled to the computing device via a network;
issuing, by the first browser to the second browser via the network, a navigation request comprising a uniform resource locator (URL) of the first page;
receiving, from the second browser, content of the first page displayed by the instance of the second browser and status information associated with the first page, the status information associated with the first page being received separately from the content of the first page;
rendering the received content and the status information in the open browser window, the status information received from the second browser being reflected by a user interface element utilized by the first browser;
receiving a second request at the second browser to navigate from the first page to a second page;
determining, by the second browser executing on the virtual machine, that the second page is compatible with the first browser; and
rendering the second page by the first browser.

2. The method of claim 1, further comprising:
providing an address of the first page to the instance of the second browser via a first communication channel established between the first browser and the instance of the second browser.

3. The method of claim 2, wherein receiving the content of the first page comprises:
receiving the content via a second communication channel established between the first browser and the instance of the second browser; and
rendering the content of the first page over a display window region of a tab in the open browser window of the first browser.

4. The method of claim 3, wherein the first communication channel is a dynamic virtual channel (DVC), and wherein the second communication channel is a remote applications integrated locally (RAIL) communication channel.

5. The method of claim 3, wherein the content of the first page comprises graphics information representative of the content of the first page, and wherein rendering the content of the first page comprises:
generating an image based on the graphics information; and
rendering the image over the display window region of the tab in the open browser window of the first browser.

6. The method of claim 1, further comprising:
receiving a third request at the first browser to navigate to a third page;

determining that the third page is incompatible with the first browser and compatible with the second browser;

sending, by the first browser, an address of the third page to the instance of the second browser via a first communication channel;

receiving content of the third page displayed by the instance of the second browser; and rendering the received content in the open browser window.

7. The method of claim 6, wherein the first page is rendered in a first browser window of the instance of the second browser, wherein the second page is rendered in a second browser window of the instance of the second browser, wherein the received content of the first page is displayed over a display window region of a first tab of the open browser window, and wherein the received content of the second page is displayed over a display window region of a second tab of the open browser window.

8. The method of claim 7, further comprising:

detecting input that causes the second tab to be active;

sending, via the first communication channel, a message to the instance of the second browser that causes the second browser window to be active;

detecting user input with respect to the content displayed over the display window region of the second tab; and providing, via the first communication channel, the user input to the instance of the second browser, the provided user input being applied to the second browser window.

9. A system, comprising:

at least one processor circuit; and at least one memory that stores program code configured to be executed by the at least one processor circuit, the program code comprising:

a tab manager configured to:

receive a request at a first browser to navigate to a first page; and determine that the first page is incompatible with the first browser and compatible with a second browser;

an application programming interface of the first browser configured to:

send an invocation request to a virtual machine to invoke an instance of the second browser executing on the virtual machine, the virtual machine executing on a remote computing device that is communicatively coupled to the at least one processor circuit via a network;

issue, by the first browser to the second browser via the network, a navigation request comprising a uniform resource locator (URL) of the first page;

receive content of the first page displayed by the instance of the second browser and status information associated with the first page, the status information associated with the first page being received separately from the content of the first page; and receive a second URL from the second browser via the network, the second URL corresponding to a second request received at the second browser to navigate from the first page to a second page at the second URL, the second browser executing on the virtual machine having determined that the second page is compatible with the first browser; and a render engine configured to render the received content and the status information received from the second browser in an open browser window of the first browser, the status information being reflected by a user interface element utilized by the first browser and to render the second page.

10. The system of claim 9, wherein the application programming interface is further configured to provide an address of the first page to the instance of the second browser via a first communication channel established between the first browser and the instance of the second browser.

11. The system of claim 10, wherein the application programming interface is further configured to:

receive the content via a second communication channel established between the first browser and the instance of the second browser; and render the content of the first page over a display window region of a tab in the open browser window of the first browser.

12. The system of claim 11, wherein the first communication channel is a dynamic virtual channel (DVC), and wherein the second communication channel is a remote applications integrated locally (RAIL) communication channel.

13. The system of claim 11, wherein the content of the first page comprises graphics information representative of the content of the first page, and wherein the render engine is further configured to:

generate an image based on the graphics information; and render the image over the display window region of the tab in the open browser window of the first browser.

14. The system of claim 9, wherein the tab manager is further configured to:

receive a third request at the first browser to navigate to a third page; and determine that the third page is incompatible with the first browser and compatible with the second browser;

wherein the application programming interface is further configured to:

send an address of the third page to the instance of the second browser via a first communication channel; and receive content of the third page displayed by the instance of the second browser; and wherein the render engine is further configured to render the received content in the open browser window.

15. The system of claim 14, wherein the first page is rendered in a first browser window of the instance of the second browser, wherein the second page is rendered in a second browser window of the instance of the second browser, wherein the received content of the first page is displayed over a display window region of a first tab of the open browser window, and wherein the received content of the second page is displayed over a display window region of a second tab of the open browser window.

16. A computer-readable storage medium having program instructions recorded thereon that, when executed by at least one processor of a computing device, perform a method, the method comprising:

executing a first browser on the computing device, the first browser having an open browser window;

receiving a request at the first browser to navigate to a first page;

determining that the first page is incompatible with the first browser and compatible with a second browser;

sending, by the first browser to a virtual machine, an invocation request to invoke an instance of the second browser executing on the virtual machine, the virtual machine executing on a remote computing device that is communicatively coupled to the computing device via a network;

issuing, by the first browser to the second browser via the network, a navigation request comprising a uniform resource locator (URL) of the first page;

receiving content of the first page displayed by the instance of the second browser and status information associated with the first page, the status information associated with the first page being received separately from the content of the first page;

rendering the received content and the status information in the open browser window, the status information received from the second browser being reflected by a user interface element utilized by the first browser;

receiving a second URL from the second browser via the network, the second URL corresponding to a second request received at the second browser to navigate from the first page to a second page at the second URL, the second browser executing on the virtual machine having determined that the second page is compatible with the first browser; and rendering the second page by the first browser.

17. The computer-readable storage medium of claim 16, the method further comprising:

providing an address of the first page to the instance of the second browser via a first communication channel established between the first browser and the instance of the second browser.

18. The computer-readable storage medium of claim 17, wherein receiving the content of the first page comprises:

receiving the content via a second communication channel established between the first browser and the instance of the second browser; and rendering the content of the first page over a display window region of a tab in the open browser window of the first browser.

19. The computer-readable storage medium of claim 18, wherein the first communication channel is a dynamic virtual channel (DVC), and wherein the second communication channel is a remote applications integrated locally (RAIL) communication channel.

20. The computer-readable storage medium of claim 18, wherein the content of the first page comprises graphics information representative of the content of the first page, and wherein rendering the content of the first page comprises:

generating an image based on the graphics information; and rendering the image over the display window region of the tab in the open browser window of the first browser.

* * * * *